(12) United States Patent
Tsuruoka

(10) Patent No.: US 12,045,049 B2
(45) Date of Patent: Jul. 23, 2024

(54) PARKING ASSIST APPARATUS

(71) Applicant: TOYOTA JIDOSHA KABUSHIKI KAISHA, Toyota (JP)

(72) Inventor: Noriyuki Tsuruoka, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/298,697

(22) Filed: Apr. 11, 2023

(65) Prior Publication Data

US 2023/0244223 A1 Aug. 3, 2023

Related U.S. Application Data

(63) Continuation of application No. 16/373,100, filed on Apr. 2, 2019, now Pat. No. 11,656,616.

(30) Foreign Application Priority Data

Apr. 3, 2018 (JP) ................................. 2018-071881

(51) Int. Cl.
  *G05D 1/00* (2024.01)
  *B62D 15/02* (2006.01)
(52) U.S. Cl.
  CPC ....... *G05D 1/0011* (2013.01); *B62D 15/0285* (2013.01); *G05D 1/0088* (2013.01); *G05D 1/0212* (2013.01)
(58) Field of Classification Search
  None
  See application file for complete search history.

(56) References Cited

U.S. PATENT DOCUMENTS

| 9,505,403 B2 | 11/2016 | Stefan |
| 10,040,482 B1 | 8/2018 | Jung et al. |

(Continued)

FOREIGN PATENT DOCUMENTS

| CN | 102030039 A | 4/2011 |
| CN | 102762417 A | 10/2012 |

(Continued)

OTHER PUBLICATIONS

The Wheel Network, 2018 Mercedes-Benz S-Class—Remote Parking Assist, Jul. 18, 2017 (Year: 2017).

(Continued)

*Primary Examiner* — Christian Chace
*Assistant Examiner* — Shayne M. Gilbertson
(74) *Attorney, Agent, or Firm* — Sughrue Mion, PLLC

(57) ABSTRACT

A parking assist apparatus is provided with: a holding device configured to hold the target parking position associated with the parking process operation; an automatic parking device configured to perform an automatic parking control of automatically controlling the vehicle such that the vehicle is parked in the target parking position, as a part of the parking process operation; and a transition device configured to change the automatic parking control into a standby state while allowing the holding device to hold the target parking position, on condition that a door of the vehicle is opened before the vehicle arrives at the target parking position. The transition device is configured to allow the automatic parking device to restart the automatic parking control, on condition that there is an execution request for the automatic parking control, when the automatic parking control is in the standby state.

8 Claims, 3 Drawing Sheets

(56) References Cited

U.S. PATENT DOCUMENTS

| | | |
|---|---|---|
| 10,449,955 B2 | 10/2019 | Kim et al. |
| 2005/0270177 A1 | 12/2005 | Mori et al. |
| 2007/0288145 A1 | 12/2007 | Maeda et al. |
| 2011/0080304 A1 | 4/2011 | Toledo et al. |
| 2012/0316704 A1 | 12/2012 | Ohbayashi et al. |
| 2014/0032031 A1 | 1/2014 | Okamura et al. |
| 2014/0244073 A1* | 8/2014 | Okamura ........... B62D 15/0285 701/2 |
| 2014/0379197 A1 | 12/2014 | Eckert et al. |
| 2015/0127208 A1 | 5/2015 | Jecker et al. |
| 2015/0360625 A1 | 12/2015 | Randler et al. |
| 2018/0029591 A1* | 2/2018 | Lavoie ................. B60W 50/14 |
| 2020/0047745 A1 | 2/2020 | Suzuki et al. |
| 2020/0298835 A1 | 9/2020 | Suzuki et al. |
| 2020/0369263 A1 | 11/2020 | Suzuki et al. |

FOREIGN PATENT DOCUMENTS

| | | |
|---|---|---|
| DE | 10 2007 049 709 A1 | 4/2009 |
| DE | 10 2014 013 692 A1 | 3/2016 |
| JP | 2007-331479 A | 12/2007 |
| JP | 2011-141854 A | 7/2011 |
| JP | 2014-129082 A | 7/2014 |
| JP | 2015-034484 A | 2/2015 |
| JP | 2015-120403 A | 7/2015 |
| JP | 2016-175553 A | 10/2016 |
| JP | 6138130 B2 | 5/2017 |
| JP | 2017-182463 A | 10/2017 |
| WO | 2007122704 A1 | 11/2007 |
| WO | 2012/124085 A1 | 9/2012 |

OTHER PUBLICATIONS

Tsuruoka, Noriyuki—U.S. Appl. No. 16/373,100, filed Apr. 2, 2019.
Office Action dated Jan. 22, 2021, issued in U.S. Appl. No. 16/373,100.
Office Action dated Aug. 12, 2021, issued in U.S. Appl. No. 16/373,100.
Advisory Action dated Dec. 22, 2021, issued in U.S. Appl. No. 16/373,100.
Office Action dated Apr. 6, 2022, issued in U.S. Appl. No. 16/373,100.
Office Action dated Sep. 9, 2022, issued in U.S. Appl. No. 16/373,100.
Notice of Allowance dated Jan. 30, 2023, issued in U.S. Appl. No. 16/373,100.

* cited by examiner

PARKING ASSIST APPARATUS

CROSS-REFERENCE TO RELATED APPLICATIONS

This application is a Continuation of U.S. application Ser. No. 16/373,100, filed Apr. 2, 2019, which is based upon and claims the benefit of priority of the prior Japanese Patent Application No. 2018-071881, filed on Apr. 3, 2018, the entire contents of which are incorporated herein by reference.

BACKGROUND

1. Technical Field

Embodiments of the present disclosure relate to a parking assist apparatus configured to park a vehicle in a target parking position.

2. Description of the Related Art

For this type of apparatus, for example, there is proposed an apparatus that is configured to perform an automatic parking control for moving a vehicle to a predetermined parking position and that is configured to end the automatic parking control and stop the vehicle if an opening operation of a door is detected during execution of the automatic parking control (refer to Japanese Patent Application Laid Open No. 2015-120403 (Patent Literature 1)). There is proposed the following technology/technique; for example, if there is a factor that does not allow a driving manoeuvre to be safely performed, such as a door of a vehicle being opened, while the driving manoeuvre is performed by an assistant system for performing an autonomous or partially autonomous driving manoeuvre, the assistant system and/or the vehicle is changed into a safe state, such as a defined initial state (refer to Japanese Patent No. 6138130 (Patent Literature 2)). In addition, related technologies/techniques are described in Japanese Patent Application Laid Open No. 2017-182463 (Patent Literature 3), Japanese Patent Application Laid Open No. 2015-034484 (Patent Literature 4)), and Japanese Patent Application Laid Open No. 2007-331479 (Patent Literature 5)).

In parking the vehicle in the target position, an occupant gets out of the vehicle or unloads the vehicle, while the vehicle is moving to the target position, depending on the width of a parking space. On the other hand, if the door is opened during execution of the automatic parking control, the automatic parking control is ended from a safety viewpoint, for example, as described in the Patent Literatures 1 and 2. However, if the automatic parking control is ended even when the door is opened due to getting out of the vehicle or unloading the vehicle before the vehicle arrives at the target position, for example, it is necessary to input the target position or the like again to restart the automatic parking control, which may impair a user's convenience.

In view of the aforementioned problems, it is therefore an object of embodiments of the present disclosure to provide a parking assist apparatus that can improve the user's convenience.

The above object of embodiments of the present disclosure can be achieved by a parking assist apparatus configured to perform a parking process operation of parking a vehicle in a target parking position, the parking assist apparatus provided with: a holding device configured to hold the target parking position associated with the parking process operation; an automatic parking device configured to perform an automatic parking control of automatically controlling the vehicle such that the vehicle is parked in the target parking position, as a part of the parking process operation; and a transition device configured to change the automatic parking control into a standby state while allowing the holding device to hold the target parking position, on condition that a door of the vehicle is opened before the vehicle arrives at the target parking position, wherein the transition device is configured to allow the automatic parking device to restart the automatic parking control, on condition that there is an execution request for the automatic parking control, when the automatic parking control is in the standby state.

DETAILED DESCRIPTION OF THE EMBODIMENTS

A parking assist apparatus according to embodiments of the present disclosure will be explained with reference to the drawings.

First Embodiment

A parking assist apparatus according to a first embodiment of the present disclosure will be explained with reference to FIG. 1 to FIG. 3.

(Configuration)

A configuration of the parking assist apparatus according to the first embodiment will be explained with reference to FIG. 1. FIG. 1 is a block diagram illustrating the configuration of the parking assist apparatus according to the first embodiment.

Figure 1:
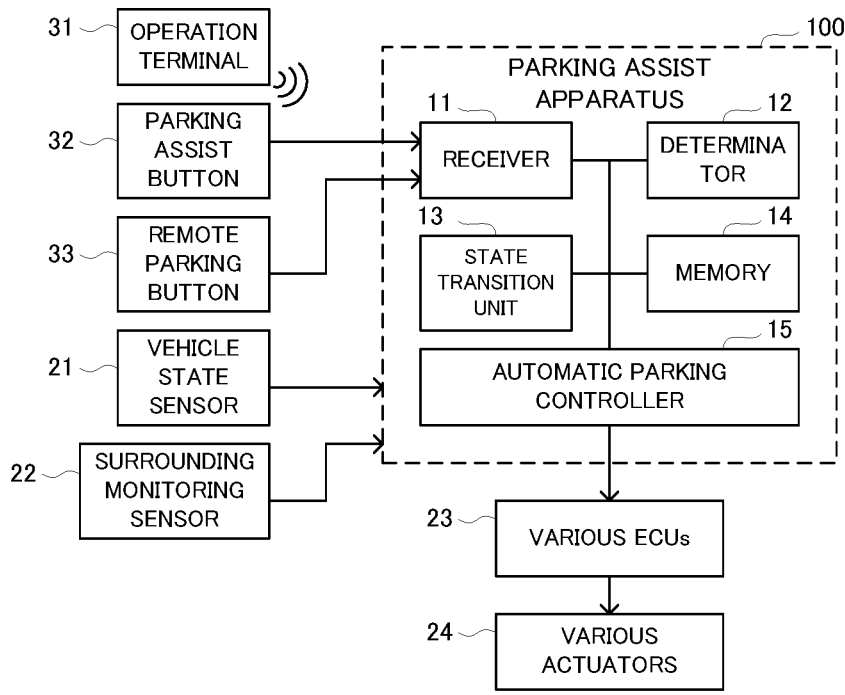
FIG. 1 is a block diagram illustrating a configuration of a parking assist apparatus according to a first embodiment.

In FIG. 1, a parking assist apparatus 100 is mounted on a vehicle 1. The vehicle 1 is provided with: a vehicle state sensor 21 including, for example, a vehicle speed sensor, a yaw rate sensor, an accelerator sensor, a brake sensor, a steering sensor, a door sensor, a shift sensor or the like; a surrounding monitoring sensor 22 including, for example, a camera, a millimeter wave radar or the like; various electronic control units (ECUs) 30 configured to respectively control various actuators 24, such as, for example, a throttle actuator, a brake actuator, and a steering actuator.

The parking assist apparatus 100 is configured to perform a parking process operation of parking the vehicle 1 in a target parking position. The parking assist apparatus 100 is provided with a receiver 11, a determinator 12, a state transition unit 13, a memory 14, and an automatic parking controller 15, as processing blocks logically realized or processing circuits physically realized in the parking assist apparatus 100, in order to perform the parking process operation. The parking assist apparatus 100 is configured to perform a so-called remote parking for parking the vehicle 1 by a remote operation, as an aspect of the parking processing operation.

The receiver 11 is configured to receive a signal sent from an operation terminal 31, which is operated by a user of the vehicle 1 in the remote parking. The receiver 11 is further configured to receive signals respectively outputted from a parking assist button 32 and a remote parking button 33, which are provided in an interior of the vehicle 1. Here, the parking assist button 32 is a button for indicating the user's intention that the user of the vehicle 1 wants the parking of the vehicle 1 (i.e., the parking process operation) performed by the parking assist apparatus 100. The remote parking button 33 is a button for indicating the user's intention that the user of the vehicle 1 wants the remote parking, which is an aspect of the parking process operation.

Various existing aspects can be applied to a method of performing the remote parking. In an example, the remote parking is performed by the user operating the operation terminal 31 from the exterior of the vehicle 1 after the user presses down the remote parking button 33.

In the memory 14, information required to perform the parking process operation is stored. The information may include not only specific information associated with the vehicle 1, such as, for example, the size of the vehicle 1 (i.e., length, width, height), but also temporal information indicating, for example, the target parking position, a via-point, such as a turn-back point, or the like.

The automatic parking controller 15 is a component that is the core of the parking assist apparatus 100. The automatic parking controller 15 is configured to control the various actuators 24 via the various ECUs, on the basis of a signal outputted from the vehicle state sensor 21 and a signal outputted from the surrounding monitoring sensor 22, in order to park the vehicle 1, as a part of the parking process operation. The automatic parking controller 15 controlling the various actuators 24 to park the vehicle 1 is referred to as an "automatic parking control", as occasion demands.

The automatic parking controller 15 is configured to perform the automatic parking control, on condition that a signal indicating an execution request for the automatic parking control, which is sent from the operation terminal 31 or which is outputted from the parking assist button 32, is received by the receiver 11. The automatic parking control performed when the signal indicating the execution request for the automatic parking control sent from the operation terminal 31 is received by the receiver 11 corresponds to the "remote parking". The determinator 12 and the state transition unit 13 will be described later.

(Parking Process Operation)

An example of a parking operation of the vehicle 1 on which the parking assist apparatus 100 as configured above is mounted will be explained with reference to FIG. 2. In an example in FIG. 2, it is assumed that the vehicle 1 moves forward to a point B, and then moves to the target parking position while moving backward from the point B.

Figure 2:
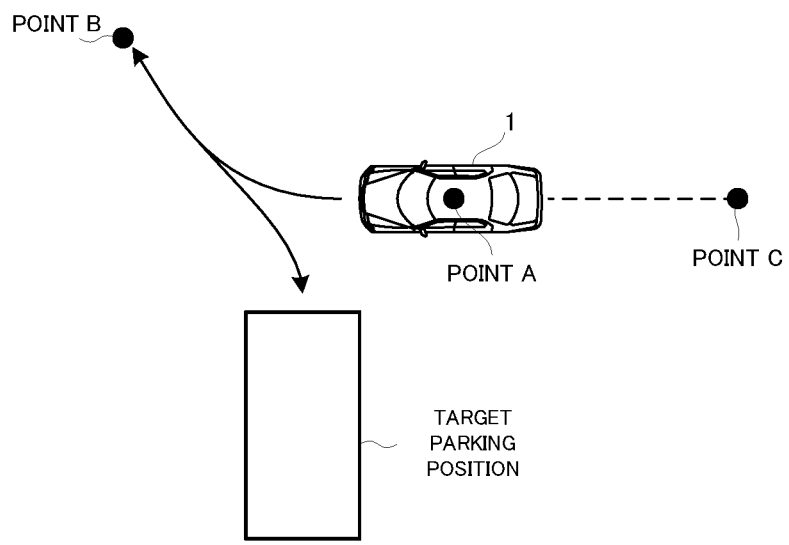
FIG. 2 is a diagram illustrating an example of a parking operation.

The following four patterns are exemplified as the vehicle 1 being parked by the parking assist apparatus 100; namely, (i) the user, i.e., a driver, drives the vehicle 1 to a point A in FIG. 2, and the vehicle 1 is moved by the parking assist apparatus 100, with the user being in the vehicle 1, from the point A to the target parking position; (ii) the user drives the vehicle 1 to the point A in FIG. 2 and gets out of the vehicle 1 at the point A, and then, the vehicle 1 is moved to the target parking position by the parking assist apparatus 100 (i.e., the remote parking is performed); (iii) the user drives the vehicle 1 to a point C in FIG. 2, and the vehicle 1 is moved by the parking assist apparatus 100, with the user being in the vehicle 1, from the point C to the point A, and the user gets out of the vehicle 1 at the point A, and then, the vehicle 1 is moved to the target parking position by the parking assist apparatus 100; (iv) the user drives the vehicle 1 to the point C in FIG. 2, the vehicle 1 is moved by the parking assist apparatus 100, with the user being in the vehicle 1, from the point C to the point A, a door is opened at the point A (e.g., If there are people in the vehicle 1, a person other than the user gets out of the vehicle or the user unloads the vehicle 1), and then, the vehicle 1 is moved to the target parking position by the parking assist apparatus 100, with the user being in the vehicle 1.

In the case of (iii) and (iv) described above, the door of the vehicle 1 is opened after the movement of the vehicle 1 by the parking assist apparatus 100, i.e., the parking process operation, is started and before the vehicle 1 arrives at the target parking position. At this time, if the parking process operation is reset due to the door being opened, the user needs to perform an operation associated with the parking process operation again from the beginning, in order to move the vehicle 1 to the target parking position from the point A by using the parking assist apparatus 100. Such a problem does not occur in the case of (i) and (ii) described above.

Thus, in the first embodiment, if the door of the vehicle 1 is opened after the movement of the vehicle 1 by the parking assist apparatus 100 is started and before the vehicle 1 arrives at the target parking position, the state transition unit 13 may change the automatic parking control performed by the automatic parking controller 15 into a standby state, while maintaining the temporal information indicating the target parking position or the like, which is stored in the memory 14, i.e., without deleting the temporal information indicating the target parking position or the like, from the memory 14. The state transition unit 13 is configured to allow the automatic parking controller 15 to restart the automatic parking control if there is an execution request for the automatic parking control when the automatic parking control is in the standby state.

Therefore, in the first embodiment, even if door of the vehicle 1 is opened after the movement of the vehicle 1 by the parking assist apparatus 100 is started and before the vehicle 1 arrives at the target parking position, the parking process operation is not reset, so that the user does not need to perform the operation associated with the parking process operation again. Moreover, the automatic parking controller 15 does not need to perform resetting of the target parking position or similar actions. Thus, a time required to restart the automatic parking control after the door of the vehicle 1 is opened is reduced in comparison with when the automatic parking controller 15 needs to perform the resetting of the target parking position or similar actions.

The parking process operation according to the first embodiment is specifically explained with reference to a flowchart in FIG. 3.

Figure 3:
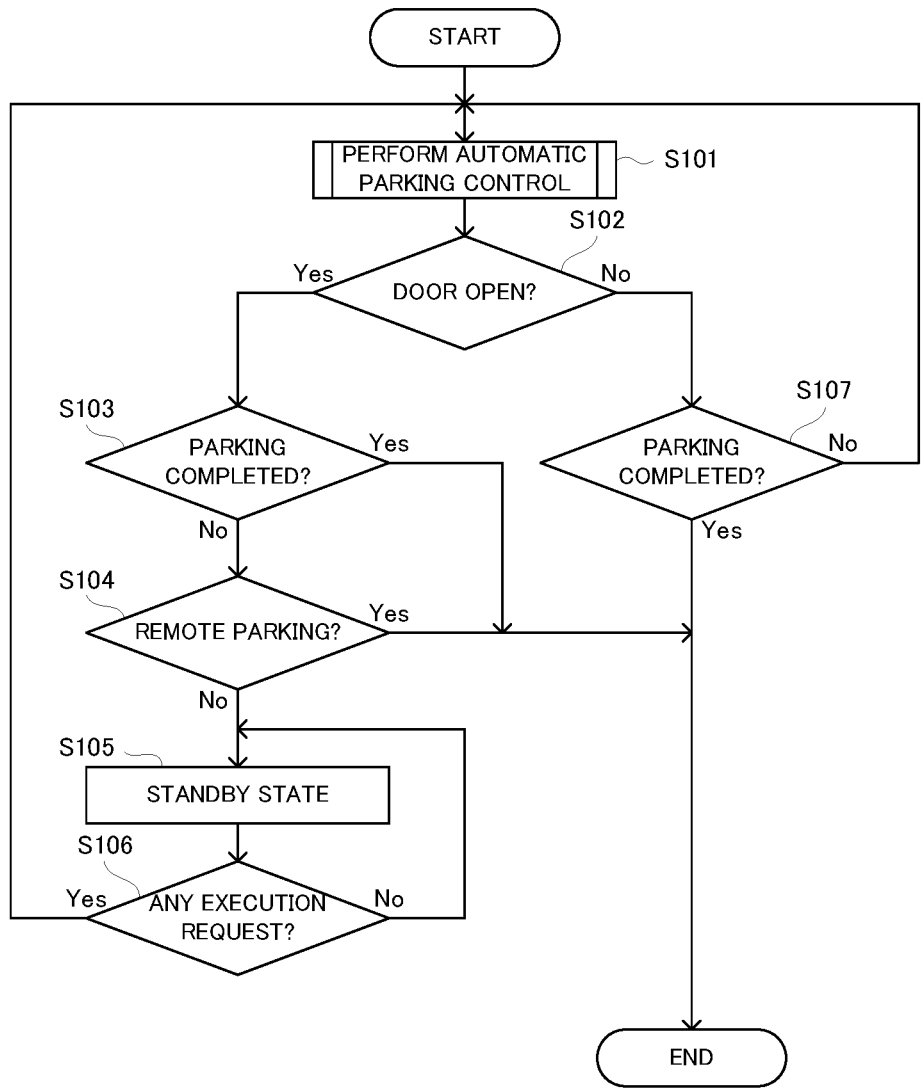
FIG. 3 is a flowchart illustrating a parking process operation according to the first embodiment.

In FIG. 3, when the automatic parking controller 15 performs the automatic parking control (step S101), the determinator 12 determines whether or not the door of the vehicle 1 is opened on the basis of the signal outputted from the vehicle state sensor 21 (step S102). In the step S102, if it is determined that the door is opened (the step S102: Yes), the determinator 12 determines whether or not the parking is completed, i.e., whether or not the vehicle 1 arrives at the target parking position (step S103).

In the step S103, if it is determined that the parking is completed (the step S103: Yes), the parking process operation is ended. On the other hand, in the step S103, if it is determined that the parking is not completed (the step S103: No), the determinator 12 determines whether or not it is the remote parking (step S104).

In the step S104, if it is determined that it is the remote parking (the step S104: Yes), the parking process operation is ended. In this case, it is estimated that the door of the vehicle 1 is opened from the exterior of the vehicle 1. Thus, in this case, the parking process operation is ended for a safety viewpoint.

On the other hand, in the step S104, if it is determined that it is not the remote parking (the step S104: No), the state transition unit 13 transitions the automatic parking control by the automatic parking controller 15 into the standby state, while maintaining the temporal information indicating the target parking position or the like, which is stored in the memory 14 (step S105).

In the first embodiment, the automatic parking control being changed into the standby state is limited only to when the automatic parking control is performed, because the receiver 11 receives the signal indicating the execution request for the automatic parking control outputted from the parking assist button 32 (which is because the automatic parking operation is ended if the door is opened in the case of the remote parking). If the automatic parking control is performed due to the signal indicating the execution request for the automatic parking control outputted from the parking assist button 32, the receiver 11 may allow the signal sent from the operation terminal 31 to be received, on condition that the automatic parking control is in the standby state. In this case, the receiver 11 may prohibit the signal sent from the operation terminal 31 from being received until the automatic parking control becomes in the standby state, or may receive the signal sent from the operation terminal 31 and treat it as being invalid. By virtue of such a configuration, the remote parking can be performed from the middle of the parking process operation.

Then, the determinator 12 determines whether or not there is an execution request for the automatic parking control (step S106). The determinator 12 determines that there is the execution request for the automatic parking control, if the receiver 11 receives the signal indicating the execution request outputted from the parking assist button 32, or if the receiver 11 receives the signal indicating the execution request sent from the operation terminal 31.

In the step S106, if it is determined that there is no execution request for the automatic parking control (the step S106: No), the standby state of the automatic parking control is maintained. On the other hand, in the step S106, if it is determined that there is the execution request for the automatic parking control (the step S106: Yes), the automatic parking control is restarted (the step S101).

In the step S102, if it is determined that the door is not opened (the step S102: No), the determinator 12 determines whether or not the parking is completed (step S107). In the step S107, if it is determined that the parking is not completed (the step S107: No), the automatic parking control is continued (the step S101). On the other hand, in the step S107, if it is determined that the parking is completed (the step S107: Yes), the parking process operation is ended.

Technical Effect

On the parking assist apparatus 100, if the door of the vehicle 1 is opened when the automatic parking control is performed, i.e., before the vehicle 1 arrives at the target parking position, the automatic parking control by the automatic parking controller 15 is changed into the standby state (excluding the case of the remote parking) while the temporal information indicating the target parking position or the like, which is stored in the memory 14, is maintained. Then, if there is the execution request for the automatic parking control when the automatic parking control is in the standby state, the automatic parking control is restarted.

On the parking assist apparatus 100, even if the door of the vehicle 1 is opened when the automatic parking control is performed, the parking process operation is not reset. Thus, the user does not need to perform the operation associated with the parking process operation again. It is therefore possible to improve the user's convenience according to the parking assist apparatus 100. Moreover, the automatic parking controller 15 does not need to perform the resetting of the target parking position or similar actions. Thus, a time required to restart the automatic parking control after the door of the vehicle 1 is opened is reduced in comparison with when the automatic parking controller 15 needs to perform the resetting of the target parking position or similar actions. Therefore, the marketability of the parking assist apparatus 100 improves, without a relatively large time, which is required to restart the automatic parking control, causing the user to feel troublesome.

Second Embodiment

A parking assist apparatus according to a second embodiment will be explained with reference to FIG. 4. The second embodiment is the same as the first embodiment, except in a part of the parking process operation. Thus, in the second embodiment, the same explanation as that in the first embodiment will be omitted, and the same parts on the drawing will carry the same reference numerals. Only a basically different point will be explained with reference to FIG. 4.

(Parking Process Operation)

A parking process operation according to the second embodiment will be specifically explained with reference to a flowchart in FIG. 4.

Figure 4:
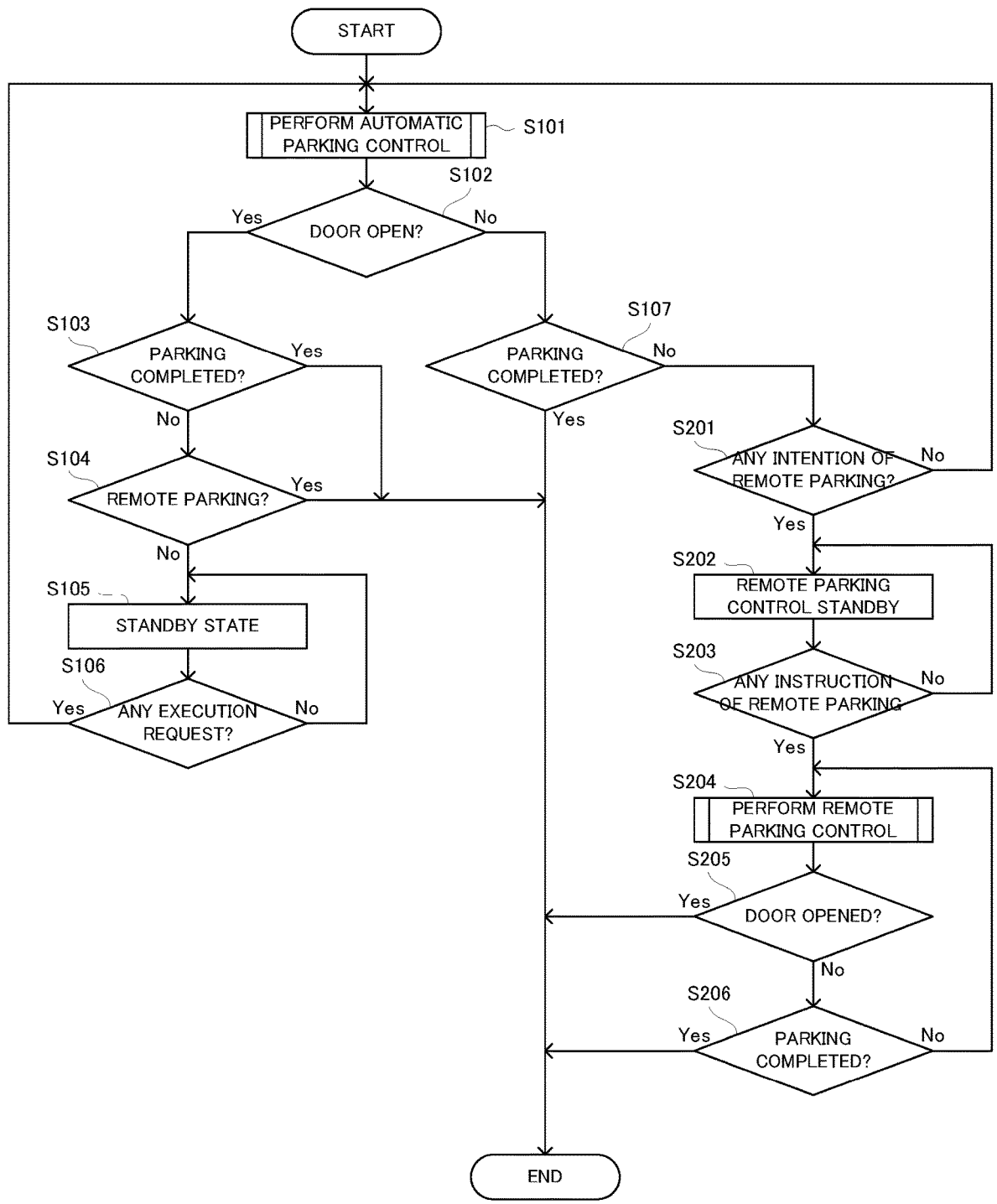
FIG. 4 is a flowchart illustrating a parking process operation according to a second embodiment.

In the step S107 in FIG. 4, if it is determined that the parking is not completed (the step S107: No), the determinator 12 determines whether or not the user of the vehicle 1 has an intention of the remote parking (step S201).

The determinator 12 determines that the user has an intention of the remote parking, for example, in the following cases: (i) if the user, i.e., a driver, shifts a shift lever to a P range or operates an electronic parking brake (EPB) or a brake pedal when the vehicle 1 is stopped while the remote parking button 33 is pressed down; or (ii) if the user accepts a notification indicating that it is changed to the remote parking, from the parking assist apparatus 100, when the vehicle 1 arrives at a predetermined drop-off or alighting position, which is different from the target parking position, and the vehicle 1 is stopped while the remote parking button 33 is pressed down; or (iii) if the receiver 11 receives a signal caused by the operation of the operation terminal 31 by the user after the receiver 11 receives the start information (instead of the remote parking button 33 being pressed down) when the operation terminal 31 is configured to send a signal indicating start information about a start of the operation terminal 31.

In the step S201, if it is determined that the user has no intention of the remote parking (the step S201: No), the automatic parking control is continued (the step S101). On the other hand, in the step S201, if it is determined that the user has the intention of the remote parking (the step S201: Yes), the state transition unit 13 changes the automatic parking control by the automatic parking controller 15 into the standby state, while maintaining the temporal information indicating the target parking position or the like, which is stored in the memory 14 (step S202). At this time, the parking process operation is not reset even if the door of the vehicle 1 is opened.

Next, the determinator 12 determines whether or not there is a remote parking instruction (step S203). The determinator 12 determines that there is the remote parking instruction if the receiver 11 receives the signal indicating the execution request for the automatic parking control sent from the operation terminal 31. In the step S203, if it is determined that there is no remote parking instruction (the step S203: No), the standby state of the automatic parking control is maintained.

On the other hand, in the step S203, if it is determined that there is the remote parking instruction (the step S203: Yes), the remote parking, i.e., the automatic parking control performed when the receiver 11 receives the signal indicating the execution request for the automatic parking control sent from the operation terminal 31, is performed (step S204).

At this time, the parking assist apparatus 100 may confirm that there is no one in the vehicle 1, for example, from an image of a camera for imaging the interior of the vehicle 1 or an output of a seat sensor, or the like. If there is a person in the vehicle 1 and/or if the door of the vehicle 1 is opened, the remote parking is not performed even if it is determined that there is the remote parking instruction in the step S203.

Then, the determinator determines whether or not the door of the vehicle 1 is opened on the basis of the signal outputted from the vehicle state sensor 21 (step S205). In the step S205, if it is determined that the door is opened (the step S205: Yes), it is estimated that the door of the vehicle 1 is opened from the exterior of the vehicle 1. Thus, in this case, the parking process operation is ended for a safety viewpoint.

On the other hand, if it is determined that the door is not opened (the step S205: No), the determinator 12 determines whether or not the parking is completed, i.e., whether or not the vehicle 1 arrives at the target parking position (step S206). In the step S206, if it is determined that the parking is completed (the step S206: Yes), the parking process operation is ended. On the other hand, in the step S206, if it is determined that the parking is not completed (the step S206: No), the remote parking is continued (the step S204).

Technical Effect

According to the parking assist apparatus 100 in the second embodiment, it is possible to improve the user's convenience, as in the parking assist apparatus 100 in the first embodiment.

Modified Example

The parking assist apparatus 100 may determine whether or not there is a sufficient drop-off or alighting space when the vehicle 1 is moved to a parking space, for example, from the signal outputted from the surrounding monitoring sensor 22 (e.g., a signal indicating an image of a camera for imaging the surrounding of the vehicle 1, etc.).

(i) If determining that there is no sufficient drop-off or alighting space when the vehicle 1 is moved to the parking space, the parking assist apparatus 100 may stop the vehicle 1 regardless of the user's intention of the vehicle 1 during the execution of the automatic parking control and may propose the remote parking to the user. If the user accepts the remote parking, the automatic parking control by the automatic parking controller 15 may be changed into the standby state while the temporal information indicating the target parking position or the like, which is stored in the memory 14, is maintained, i.e., a process corresponding to the step S202 in FIG. 4 may be performed.

(ii) If determining that there is no sufficient drop-off or alighting space when the vehicle 1 is moved to the parking space, the parking assist apparatus 100 may stop the vehicle 1 regardless of the user's intention of the vehicle 1 during the execution of the automatic parking control and may propose getting out of the vehicle 1 to the user. If the user accept getting out of the vehicle 1, the automatic parking control by the automatic parking controller 15 may be changed into the standby state while the temporal information indicating the target parking position or the like, which is stored in the memory 14, is maintained. In this case, the parking assist apparatus 100 may move the vehicle 1 to the target parking position, automatically, i.e., in a method different from the remote parking, after the user gets out of the vehicle 1.

Various aspects of embodiments of the present disclosure derived from the embodiments and modified examples explained above will be explained hereinafter.

A parking assist apparatus according to an aspect of embodiments of the present disclosure is a parking assist apparatus configured to perform a parking process operation of parking a vehicle in a target parking position, the parking assist apparatus provided with: a holding device configured to hold the target parking position associated with the parking process operation; an automatic parking device configured to perform an automatic parking control of automatically controlling the vehicle such that the vehicle is parked in the target parking position, as a part of the parking process operation; and a transition device configured to change the automatic parking control into a standby state while allowing the holding device to hold the target parking position, on condition that a door of the vehicle is opened before the vehicle arrives at the target parking position, wherein the transition device is configured to allow the automatic parking device to restart the automatic parking control, on condition that there is an execution request for the automatic parking control, when the automatic parking control is in the standby state.

In the aforementioned embodiments, the "memory 14" corresponds to an example of the "holding device", the "automatic parking controller 15" corresponds to an example of the "automatic parking device", and the "state transition unit 13" corresponds to an example of the "transition device".

The expression "automatically controlling the vehicle such that the vehicle is parked in the target parking position" may mean that the vehicle is controlled to be parked in the target position without a driver of the vehicle operating, for example, a steering wheel, an accelerator pedal, a brake pedal or the like (excluding the driver of the vehicle operating an operation terminal for the remote parking (corresponding to the "operation terminal 31" in the aforementioned embodiments).

On the parking assist apparatus, the automatic parking control is changed into the standby state while the holding device holds the target parking position, even if the door of the vehicle is opened before the vehicle, which is performing the automatic parking control, arrives at the target parking position. Thus, when the automatic parking control is restarted, the user does not need to perform the operation associated with the parking process operation from the beginning. In other words, it is possible to restart the automatic parking control, for example, without resetting the target parking position, even if the door of the vehicle is opened before the vehicle, which is performing the automatic parking control, arrives at the target parking position, on the parking assist apparatus. It is therefore possible to improve the user's convenience according to the parking assist apparatus.

In an aspect of the parking assist apparatus, it is provided with a receiver configured to receive the execution request for the automatic parking control from an exterior of the vehicle. According to this aspect, it is possible to allow the parking assist apparatus to perform the remote parking, i.e., the automatic parking control due to the execution request from the exterior of the vehicle.

In this aspect, the receiver is further configured to receive the execution request for the automatic parking control from an interior of the vehicle, and if the automatic parking control is started due to the execution request for the automatic parking control from the interior and the automatic parking control is then changed into the standby state, the receiver may allow the execution request for the automatic parking control from the exterior to be received. By virtue of such a configuration, it is possible to change to the remote parking in the middle of the automatic parking control.

In a period until the automatic parking control becomes in the standby state after the automatic parking control is started by the automatic parking device due to the execution request for the automatic parking control from the interior, the receiver typically does not receive the execution request for the automatic parking control from the exterior of the vehicle; however, if the receiver receives the execution request for the automatic parking control from the exterior of the vehicle, the receiver may treat the execution request as being in valid.

In another aspect of the parking assist apparatus, it is provided with a determinator configured to determine whether or not a user of the vehicle has an intention to perform the automatic parking control by an operation from an exterior of the vehicle while the automatic parking control is performed and if the door of the vehicle is closed, wherein the transition device is configured to change the automatic parking control into the standby state while allowing the holding device to hold the target parking position, on condition that it is determined that there is the intention.

According to this aspect, the automatic parking control is changed into the standby state in accordance with the user's intention to perform the remote parking, i.e., the intention to start the automatic parking control by the operation from the exterior of the vehicle. It is thus possible to easily change to the remote parking in the middle of the automatic parking control. In the aforementioned embodiments, the "determinator 12" corresponds to an example of the "determinator".

The present disclosure may be embodied in other specific forms without departing from the spirit or essential characteristics thereof. The present embodiments and examples are therefore to be considered in all respects as illustrative and not restrictive, the scope of the disclosure being indicated by the appended claims rather than by the foregoing description and all changes which come in the meaning and range of equivalency of the claims are therefore intended to be embraced therein.

What is claimed is:

1. A vehicle comprising:
a camera mounted in the vehicle configured to image a surrounding of the vehicle; and
an electronic control unit including a processing circuit configured to:
perform an automatic parking control while a user is inside the vehicle;
during the automatic parking control, determine whether or not a drop off space of a target parking space meets a predetermined condition based on a signal indicating an image obtained from the camera, before the vehicle reaches the target parking space during the automatic parking control; and
when it is determined that the drop off space does not meet the predetermined condition, propose, to the user inside the vehicle, changing from the automatic parking control to a remote parking before the vehicle reaches the target parking space, wherein the remote parking is a parking control in which an execution request is performed by the user from an exterior of the vehicle.

2. The vehicle according to claim 1, wherein
determining whether or not the drop off space meets the predetermined condition is performed, before the vehicle reaches the target parking space during the automatic parking control, by determining whether or not there will be a sufficient drop off space when the vehicle moves to the target parking space.

3. The vehicle according to claim 1, wherein
the processing circuit is further configured to change the automatic parking control into a standby state when the user of the vehicle accepts the remote parking after the remote parking is proposed to the user.

4. The vehicle according to claim 3, wherein
the processing circuit further configured to restart the automatic parking control when the execution request is received from the exterior of the vehicle after the automatic parking control has been in the standby state.

5. A parking assist method including:
performing an automatic parking control while a user is inside the vehicle;
during the automatic parking control, determining whether or not a drop off space of a target parking space meets a predetermined condition, before the vehicle reaches the target parking space during the automatic parking control, wherein determining whether or not the drop off space meets the predetermined condition is performed on a basis of a signal indicating an image obtained from a camera mounted on the vehicle; and
when it is determined that the drop off space does not meet the predetermined condition, proposing, to the user inside the vehicle, a change from the automatic parking control to a remote parking before the vehicle reaches the target parking space, wherein the remote parking is a parking control in which an execution request is performed by the user from an exterior of the vehicle.

6. The parking assist method according to claim 5, wherein
determining whether or not the drop off space meets the predetermined condition is performed, before the vehicle reaches the target parking space during the automatic parking control, by determining whether or not there will be a sufficient drop off space when the vehicle moves to the target parking space.

7. The parking assist method according to claim 5, further including:
  changing the automatic parking control into a standby state when the user of the vehicle accepts the remote parking after the remote parking is proposed to the user.

8. The parking assist method according to claim 7, further including:
  restarting the automatic parking control when the execution request is received from the exterior of the vehicle after the automatic parking control has been in the standby state.

* * * * *